March 21, 1967 L. HORNBOSTEL 3,310,174

WATER FILTRATION APPARATUS

Filed April 15, 1963

INVENTOR.
Lloyd Hornbostel
BY
ATTORNEYS

United States Patent Office 3,310,174
Patented Mar. 21, 1967

3,310,174
WATER FILTRATION APPARATUS
Lloyd Hornbostel, Beloit, Wis., assignor to Beloit Corporation, Beloit, Wis., a corporation of Wisconsin
Filed Apr. 15, 1963, Ser. No. 273,185
1 Claim. (Cl. 210—193)

The present invention relates to improvements in filtering devices and more particularly relates to a device for continuous filtration by applying a layer of precoating material to a web for enhancing its filtering properties and thereafter filtering liquid through the web.

In the filtering operation contemplated by the present invention a rotatable perforate support drum carries a web of porous fabric continually into a container which receives liquid to be filtered in a continual flow. The web is prepared for filtering by precoating with a material such as diatomaceous earth which is applied in a carrier fluid to the outer surface of the web while it is supported on the drum and the carrier fluid is continually removed from within the drum. The precoating is applied in a precoating chamber which is within the container but is separated therefrom. The filtering web may be moved continuously or intermittently for precoating and may be subsequently discarded or cleaned by removing the precoating and filtered material therefrom.

It is accordingly an object of the present invention to provide an improved filtering device wherein in a compact unit device a filtering fabric is prepared by precoating and is immediately ready for filtering use.

A further object of the invention is to provide a compact unit mechanism which is capable of continuous operation for precoating a filtering web and has improved arrangements for supplying and utilizing the precoating material and removing a precoating carrier fluid and for supplying liquid to be filtered when removing the filtrate.

A still further object of the invention is to provide an improved mechanism for handling and supporting a filtering web capable of filtering a large volume of liquid such as the white water in a paper making machine.

Figure 1:
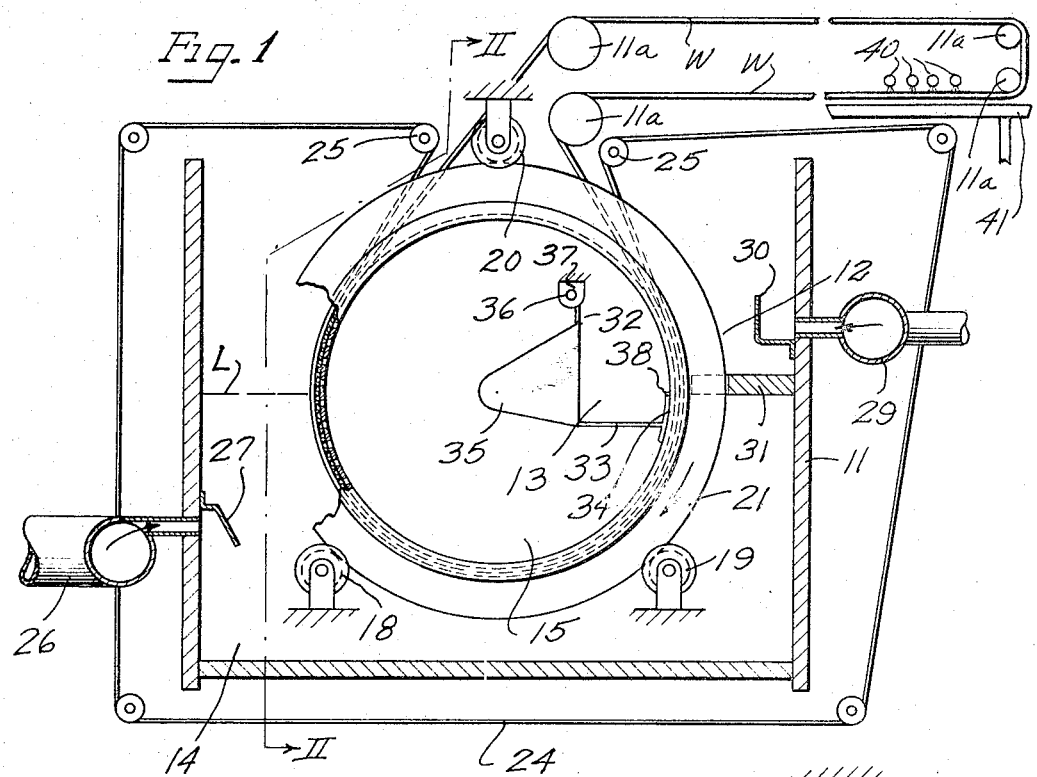
Figure 2:
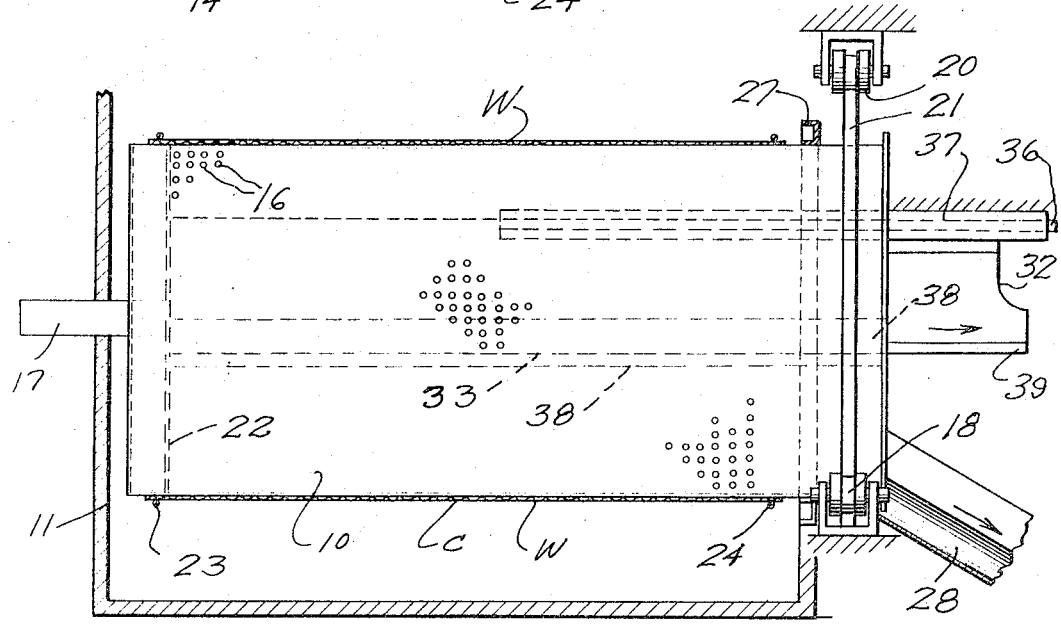

Other objectives, advantages and features will become more apparent with the teaching of the principles of the present invention in connection with the disclosure of the preferred embodiment thereof in the specification, claim and drawings, in which:

FIGURE 1 is an end elevational view shown partially in section of a filtering mechanism constructed and operating in accordance with the principles of the present invention, with the illustration generally shown in schematic form; and FIGURE 2 is a vertical sectional view taken substantially along line II—II of FIGURE 1.

On the drawings:

The filtering device illustrated in FIGURES 1 and 2 includes a rotatable porous horizontal hollow support drum 10. The drum is supported within a container 11.

A web of filter fabric W wraps said drum and advances as the drum rotates. The filter fabric may be any suitable filtering material such as a screen or cloth with openings dependent upon the size of the particles to be removed from the filtrate. A loop of nylon cloth is well suited for filtering operations such as for white water in a paper making machine. The web may be disposable, fed off of a supply roll so that the end drawn off of the drum is disposed of when it has completed its filtering operation and a fresh length of web is fed onto the drum. In some operations it will be preferred that the web be formed in a continuous loop, and this structure is illustrated in the drawings with the web being backwashed or cleaned for reuse, and the web W is suitably guided and supported on support rolls shown generally at 11a.

The web is prepared for filtering by being coated with a precoat material which is supplied to the web in a precoat chamber 12. Suitable precoat materials are used for enhancing the filtering performance of the web, and one material well suited is diatomaceous earth. The diatomaceous earth is continuously supplied in a slurry or suspended in a carrier fluid and the precoating will deposit on the outer surface of the web W with the carrier fluid passing through the web and the porous drum 10 into the interior of the drum to be received by a carrier fluid receiving chamber 13.

A liquid to be filtered is fed into the container 11 outside of the drum which space forms a liquid chamber 14. As the liquid is filtered it flows inwardly into the drum interior 15 where the filtrate flows axially along the bottom of the drum to be removed.

The drum may be constructed of a suitable material such as metal made perforate by perforations 16, or the drum may be formed of a relatively rigid screen mounted on a frame.

A first end of the drum is closed by an end wall 22 and is supported by a shaft 17 on suitable bearings, not shown, such as may be provided in the wall of the container 11. The second end of the drum 10 is open, and is provided with an annular support rim 21 mounted on support and guide rollers 18, 19 and 20 which rotatably support the drum and prevent it from being displaced or from being lifted upwardly out of the container from the tension of the web W. The drum may be driven in rotation by a separate suitable drive motor, or may be rotated by the web which will be suitably driven. The drum may be continuously rotated so as to advance the filtering web or may be rotated intermittently in steps to bring fresh web material down into the container when the web becomes coated with material filtered from the liquid.

The ends of the web are sealed and firmly held to the drum 10 to prevent the liquid in the container from leaking under the ends to bypass the filtering web W by sealing cables or lines 23 and 24 for each end. These lines are suitably supported on rollers such as 25 spaced to carry the lines into the container as the drum rotates and the lines are suitably tensioned so as to hold the web against the web surface. For this purpose the lines are brought into the container in close adjacency to the webs to hold them against the drum as soon as it becomes submerged in the liquid to be filtered. The liquid in the container may be controlled to rise to a suitable level such as generally shown by the level L in FIGURE 1. This will expose substantially half of the periphery of the drum to liquid to be filtered. The liquid of course could be run at a lower level or at a higher level and the precoating chamber 12 is substantially isolated from the liquid in the container by the precoating barrier wall 31 which extends across the container in close-running adjacency to the outside of the drum to prevent the escape of precoating material from the precoating chamber 12.

Liquid to be filtered is directed into the container through a suitable inlet line 26 provided with a baffle 27 for distribution of the liquid. The filtrate after it passes through the web flows axially along within the drum 10 and out through the open end to a receiving spout 28.

Precoating material in its fluid carrier is supplied through a precoating inlet line 29 and a baffle 30 is positioned within the precoating chamber 12 for distributing the precoating slurry along the container. Precoating material will be deposited in a uniform layer on the outer surface of the web W and the carrier fluid will flow into the fluid chamber 13 which is defined by walls 32 and 33. These walls extend the length of the drum and project out through the open end for discharge of the fluid through a spout 39. The walls of the precoating fluid chamber 13 are pivotally supported on a support rod 36 pivoted in a mount 37. The lower wall 33 has a seal 34 at its edge which runs in close-running sealing relation to the inner surface of the drum 10. A wall 38 extends upwardly from the lower wall 33 to form the seal 34 and is arcuately convex shaped to conform to the inner surface of the drum and slide thereagainst and prevent the escape of precoating carrier fluid down into the drum interior 15 to mix with the filtrate. The chamber 13 is counter-weighted by a weight 35 which causes it to pivotally swing against the inner surface of the drum and hold the wall 38 against the drum to form the seal 34.

As the web leaves the container carrying the filtered residue it can be cleaned such as by backwashing. A plurality of backwash sprays 40 are positioned on the inner surface of the web W to clean the material from the surface. The material will be caught by a saveall pan 41 and collected and may be used for various purposes such as agricultural mulch or soil dressing, dependent upon the nature of the material.

As a summary of operation, the web W passes downwardly into the container 11 and precoat is applied from a chamber 12 with the precoat carrier fluid flowing inwardly collected in the fluid chamber 13 to flow out the end of the drum in the spout 39. Liquid to be filtered flows upwardly through the precoated web from the chamber 14 to the interior 15 of the drum where the filtrate flows out the end through the spout 28. The web W is changed by advancing it with rotation of the drum 10 and the web may be discarded or cleaned for reuse if it is in looped form.

Thus it will be seen that I have provided a compact device capable of continuous operation which meets the objectives, advantages and features above set forth. The mechanism is capable of automatic operation by the provision of devices for advancing the drum at a sufficient rate to maintain the level L by delivering flow into the container at a constant rate, and if the web becomes clogged the liquid level will rise and the drum 10 can be advanced to provide additional unused filter material so that the filtering rate remains uniform. Similarly the supply of precoating can be controlled to be fed continuously if the web is continuously advanced or to be fed intermittently in accordance with the advance of the web. The precoat material automatically provides a layer of precoating shown at C in FIGURE 2 on the outer surface of the web.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

A filtering mechanism comprising in combination, a rotatable perforated hollow horizontal support drum, a continuous closed looped web of nylon cloth wrapping said drum and movable with the drum, an open container for a liquid to be filtered being positioned so that the wrapped drum is partially submerged in said liquid, a closing end wall at one end of the drum so that the inside of the drum is separated from the outside of the drum, the other end of said drum being open, a seal between the container and the drum at said other end preventing the escape of liquid from the container, a horizontal supporting shaft secured to said one end of the drum, spaced supporting bearings engaging a supporting rim at said other end of the drum, looped sealing lines extending outside of the drum and downwardly into the container engaging the web at the ends of the drum and holding the web thereto, a precoat chamber on the down-running side of the drum having a lower wall extending in close-running relation to the drum, a precoat inlet into the precoat chamber having a distributing baffle for providing a continuous supply of precoating material in a carrier fluid to the precoat chamber, a carrier fluid collecting chamber within the drum opposite the precoat chamber pivotally supported with a lower wall in close-running sealing engagement with the inner wall of the drum and being weighted for urging said lower wall into continuous sealing engagement with the drum, an extension on said carrier fluid chamber projecting from the open end of the drum for the continual removal of carrier fluid, inlet means into the container for delivering the liquid to be filtered including a distributing baffle, a filtrate removal channel beneath the open end of the container for removing filtrate as it flows out of said open end, web guide means supportingly leading the web from the container, and means removing the precoating layer from the web with filtered materials collected thereon after the web leaves the container and supported by said guide means.

References Cited by the Examiner

UNITED STATES PATENTS

| | | | |
|---|---|---|---|
| 917,305 | 4/1909 | Johnson | 210—402 |
| 2,633,993 | 4/1953 | Biggar | 210—401 X |
| 2,751,086 | 6/1956 | Borjeson | 210—193 |

FOREIGN PATENTS 878,335   6/1953   Germany.

OTHER REFERENCES

German printed application, K25128, IVc/12d, 4–1956.

REUBEN FRIEDMAN, *Primary Examiner.*

F. W. MEDLEY, *Assistant Examiner.*